United States Patent
Durr et al.

(10) Patent No.: US 7,055,146 B1
(45) Date of Patent: May 30, 2006

(54) METHOD AND SYSTEM FOR DYNAMICALLY INSERTING MODIFICATIONS FOR IDENTIFIED PROGRAMS

(75) Inventors: Philip G Durr, Redmond, WA (US);
Donald J Munsil, Kirkland, WA (US);
Mark P Derbecker, Seattle, WA (US);
Lindsay W Steventon, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 515 days.

(21) Appl. No.: 09/801,951

(22) Filed: Mar. 8, 2001

(51) Int. Cl.
*G06F 9/44* (2006.01)

(52) U.S. Cl. ..................... 717/162; 717/168

(58) Field of Classification Search ............. 717/111, 717/168, 131, 118, 162, 166, 127, 130; 703/22; 714/41; 719/328
See application file for complete search history.

(56) References Cited

U.S. PATENT DOCUMENTS

| | | | |
|---|---|---|---|
| 5,193,158 A * | 3/1993 | Kinney et al. | 712/244 |
| 5,619,716 A * | 4/1997 | Nonaka et al. | 717/167 |
| 5,832,271 A | 11/1998 | Devanbu | |
| 5,983,267 A | 11/1999 | Shklar et al. | |
| 6,122,639 A | 9/2000 | Babu et al. | |
| 6,199,063 B1 | 3/2001 | Colby et al. | |
| 6,330,569 B1 * | 12/2001 | Baisley et al. | 707/203 |
| 6,412,109 B1 * | 6/2002 | Ghosh | 717/155 |
| 6,513,133 B1 * | 1/2003 | Campbell | 714/38 |
| 6,760,907 B1 * | 7/2004 | Shaylor | 717/158 |

OTHER PUBLICATIONS

Wahbe et al. Efficient Software Based Fault Isolation. ACM. 1993. pp. 203-216.*
U.S. Appl. No. 09/513,016, filed Feb. 25, 2000, Lupu et al.
U.S. Appl. No. 09/544,512, filed Apr. 6, 2000, Lupu et al.
U.S. Appl. No. 09/544,514, filed Apr. 6, 2000, Lupu.
U.S. Appl. No. 09/801,950, filed Mar. 8, 2001, Durr et al.
"Programming Applications Microsoft Windows," Fourth Edition, by Jeffrey Richter, pp. 794-800.
Intel Corporation, "Exceptions and Interrupts", *80386 Programmer's Reference Manual*, Chapter 9, pp. 9-1—9-21 (1986).

* cited by examiner

*Primary Examiner*—Wei Y. Zhen
(74) *Attorney, Agent, or Firm*—Microsoft Corporation (57) ABSTRACT

A system and method are for inserting modifications into an executable program at the time an operating system loads the executable program for execution. The system includes a program modification database that provides a general depository of program changes in the form of substitute APIs and direct program patches. The system further comprises a program loader routine that identifies an entry in the program modification database corresponding to a program selected for execution on a computer system. The loader routine incorporates changes identified in the database entry associated with the selected program into a program segment (e.g., API) substitution table. After constructing the substitution table, each table entry includes a called API reference (e.g., its handle or address) and a reference to a substitute API.

42 Claims, 6 Drawing Sheets

220 —<DATABASE>
    224 —<LIBRARY>
        228 —<INCLUDE MODULE="XXX.DLL"/>
        230 —<EXCLUDE MODULE="YYY.DLL"/>
        232 —<DLL NAME= "MyShim.dll">
            234 —<DESCRIPTION>
            236 —<EXCLUDE MODULE="FOO.DLL"/>
            238 —<INCLUDE MODULE="BAR.DLL"/>
            </DLL>
        240 —<PATCH NAME= "MyPatch">
            244 —<MATCH_BYTES MODULE="%EXE%" OFFSET="0x00083FE2">6a 01 56</MATCH_BYTES>
            246 —<WRITE_BYTES MODULE="%EXE%" OFFSET="0x00083FE2">EB 07</WRITE_BYTES>
        242 —</PATCH>
    226 —</LIBRARY>

248 —<APP NAME="AppName" VENDOR="BigISV">

254 —<HISTORY ALIAS="billg" DATE="01/02/2000">
            <DESCRIPTION>
            </DESCRIPTION>
        256 —</HISTORY>

252 —<EXE NAME="AUTORUN.EXE"
            260 —SIZE="12345"
            262 —CHECKSUM="0xDEADBEEF"
            264 —TIME="01/01/2001 01:01:01">

266 —<MATCHING_FILE NAME="..\WIN\MYMATCH.FOO"
                SIZE="2468"
                CHECKSUM="0xBEDEBEDE"/>
            270 —<DLL NAME= "MyShim.dll>
                274 —<EXCLUDE MODULE="FOO.DLL"/>
                276 —<INCLUDE MODULE="BOO.DLL"/>
            272 —</DLL>
        278 —</EXE>

280 —<EXE NAME="SETUP.EXE"
            SIZE="67890"
            CHECKSUM="0xFEEDBEAD"
            TIME="02/02/2002 02:02:02">

282 —<PATCH NAME="MyPatch"/>
        </EXE>
    250 —</APP>
222 —</DATABASE>

| Called API (Address) | Replaced Byte (Hex Representation) | Substitute API Reference | Exclusion/Inclusion Policy |
|---|---|---|---|
| GetVersion | A4 | Version_lie_handle | "Exclude" Winsock.dll |
| Old API | 8C | New_API_handle | NULL |
| ... | ... | ... | ... |

320 → Called API (Address)
322 → Replaced Byte
324 → Substitute API Reference
326 → Exclusion/Inclusion Policy

FIG. 8

METHOD AND SYSTEM FOR DYNAMICALLY INSERTING MODIFICATIONS FOR IDENTIFIED PROGRAMS

CROSS-REFERENCE TO RELATED APPLICATION

This application is related to co-pending application by Durr et al. U.S. patent application Ser. No. 09/801,950, filed Mar. 8, 2001, entitled: "A COMPUTER SYSTEM UTILITY FACILITATING DYNAMICALLY PROVIDING PROGRAM MODIFICATIONS FOR IDENTIFIED PROGRAMS," that is explicitly incorporated herein by reference in its entirety, including any appendices and references therein.

AREA OF THE INVENTION

The present invention generally relates to executable computer program architectures. More particularly, the present invention relates to methods and systems for implementing computer program modifications. Such modifications replace or augment executable program instructions in existing computer programs (e.g., operating systems and applications) or data associated with computer programs to improve system operation and/or repair later-discovered defects. Even more particularly, the present invention relates to program modifications dynamically incorporated into a computer program (i.e., at the time an operating system loads a program for execution).

BACKGROUND OF THE INVENTION

Software developers occasionally discover minor errors in previously released programs. Furthermore, incompatibilities between an old program and a new operating system arise when a user updates an operating system. New computer hardware can also result in the discovery of errors in software designed to run on a previously existing hardware platform. Recalling entire programs can be very costly and impractical in cases where the error is relatively minor and/or the number of distributed programs is relatively large. In such instances downloadable software patches offer a practical tool for inserting replacement instructions or data enabling the software to operating properly. Software patches in many instances modify the operation of, or add functionality to, a program to improve operation of the program. Thus, if a software developer, user or other party identifies a bug or other needed fix in an existing computer program, then the developer distributes a patch for insertion by a user into the computer program to remedy the incompatibility.

Such installed patches in many instances take the form of permanent patches. Installing a permanent patch within a program modifies the program such that changes are stored within the executable code itself. In addition to the changes within the code itself, a permanent patch may reference an externally stored patch routine or function. For example, a program is modified to reference a replacement DLL by changing an address in the import section.

A permanent patch may take the form of replacement bytes inserted directly into the prior version of the program. Alternatively the permanent patch consists of a "hook" inserted into the prior version of the program to call an outside routine or function. The programming technique of "hooking" thus comprises identifying problematic program segments and then injecting substitute or additional executable instructions into the executable program to remedy the problem. In the case of API hooking, this patching procedure involves identifying a particular segment of code for calling an API that results in undesirable program behavior. Next, substitute code is placed before, or in place of, the problematic API call. The substitute code invokes execution of referenced substitute program segments. Permanent patches are relatively easy to carry out. However, in many instances this technique cannot be used. Examples of such instances are discussed herein below.

A first instance where a permanent patch cannot easily be incorporated into a program is non-universal changes to an operating system. Software patches are not limited to executable programs. In some instances operating system software is patched. Permanent patches are inserted into the operating system to remedy universal errors (i.e., errors generally associated with all uses of the operating system program). The permanent patch to the operating system software must be compatible with other existing programs. Otherwise, the permanent patch creates new errors requiring further patches.

In a second instance where permanent patches cannot be utilized is for programs that do not permit changes to their code. Since a computer program must permit changes to its original code to implement a permanent patch, programs that are stored upon, and executed from, read only memory media cannot be fixed via permanent patches. Furthermore, a number of computer-based video games include anti-tampering mechanisms preventing changes to either the computer instructions or data. The anti-tampering mechanisms ensure proper use and operation of the programs, but they also prevent applying permanent software patches. Since a permanent patch necessitates changing a computer program's code, software with anti-tampering mechanisms are unlikely to allow even relatively minor permanent software patches. In such instances, installing a software patch requires disabling the anti-tampering mechanisms of a computer program. Thus, when faced with a need to make even minor changes to a tamper-protected program, developers either issue entire new copies of a program in an updated form or disable the anti-tampering mechanisms.

One way to patch programs having anti-tampering mechanisms is to change a set of operating system APIs (application program interfaces) called by the program rather than the program itself. Anti-tampering mechanisms are unlikely to detect changes to the APIs. For example, many programs include a "get version" operating system command/API enabling applications to determine the version of an operating system installed upon a computer system upon which the executable programs execute. A computer program executing on a computer running a new version of an operating system will determine that the version of the operating system is unknown. The computer program registers an error condition and prevents further program execution. However, in many instances a computer program's operation is unaffected by changes present in the new operating system, and a simple incompatibility is eliminated by installing a patch in the API causing issuance of an expected prior) version identification when the program executes the "get version" command. Such a fix does not require modifications to the computer program itself, and therefore anti-tampering safeguards are unaffected by such a patch. The drawback to changing such APIs permanently is, as mentioned above, the potential errors arising from the changes to the APIs when other programs are executed.

There exists a need to make changes to a program in a manner that does not interfere with the operation of other, properly functioning programs, is transparent to users, and does not invoke software protection mechanisms built into programs to prevent unauthorized modifications.

SUMMARY OF THE INVENTION

The present invention concerns dynamic patching that occurs at the time a user invokes a particular executable program. The changes are incorporated into the copy of the executable program loaded into the active process space of a computer system when the executable is loaded. The modifications are temporary modifications, and are not maintained when the executable is closed. The present invention renders software compatible without permanent modifications to the executable program.

More particularly, the present invention comprises a method and system for loading an executable program and associated modification code segments relating to the executable program. The associated modification code segments, sometimes referred to as "program patches" typically are created after thousands, even millions, of copies of the executable program have been distributed to users. The method and system of the present invention facilitates implementing fixes within copies of such programs by initially receiving a set of original program segments referenced by the executable program. The original segments are, by way of example, APIs or more generally functions. The system identifies a set of substitute program segments associated with ones of the original set of program segments. This is generally accomplished by locating an entry in a modification database corresponding to the executable program and determining the substitute code associated with the entry. Next, the system modifies the original set of program segments to include an exception inducing code (e.g., a CLI instruction). When a particular exception inducing code is encountered by the system during execution of the modified original program segments, an association created between the particular exception and one of the substitute program segments facilitates substitute code execution.

BRIEF DESCRIPTION OF THE DRAWINGS

The appended claims set forth the features of the present invention with particularity. The invention, together with its objects and advantages, may be best understood from the following detailed description taken in conjunction with the accompanying drawings of which:

DETAILED DESCRIPTION OF AN ILLUSTRATIVE EMBODIMENT

The need for a solution to the present problem of providing subsequently formulated modifications for widely released computer programs is addressed by the disclosed system and method for inserting modifications into an executable program at the time an operating system loads the executable program for execution. The exemplary embodiment of the system includes a program modification database that provides a general depository of program changes in the form of substitute APIs and direct program patches. The exemplary system further comprises a program loader routine that identifies an entry in the program modification database corresponding to a program selected for execution on a computer system. The loader routine incorporates changes identified in the database entry associated with the selected program into a program segment (e.g., API) substitution table. After constructing the substitution table, each table entry includes a called API reference (e.g., its handle or address) and a reference to a substitute API.

During run time, after the executable program and substitute APIs have been loaded into the active process space (e.g., RAM) of a computer system, when a particular one of the substituted APIs is called, an exception notification issues. In response to the exception, an exception handling routine confirms a need to execute a substitute API, locates the substitute API by reference to the substitution table, and then executes the substitute API. In contrast to prior program patching techniques, all modifications to an original executable program performed by the program loader are non-permanent. Modifications are applied to a copy of the permanent version of the executable program stored at the time the executable is loaded for execution by a computer system's operating system.

In an embodiment of the invention, the program modifications encompass a broad range of program substitution structures including, by way of example: (1) substitute APIs provided via dynamically linked library files and (2) in-memory program patches. The substitute functions comprise executable code for performing a function. The in-memory program patches specify substitute byte data within a particular program. While the drawings and detailed description focus primarily upon executable program instructions and APIs, the program modification database architecture is applicable to any type of program segment information for modifying either instruction code or data values within a program.

Rather than permanently modifying the code of an executable, in accordance with an embodiment of the present invention disclosed herein, executable's API calls are modified to create an exception (e.g., a CLI instruction is inserted in the original called API). The exception handling routine redirects operation to an in-memory DLL (sometimes referred to herein as "a shim core"). The shim core then invokes substitution code in place of the original called API. This allows a new operating system to show a legacy executable program the behavior that it expects from a previous operating system's APIs. The functionality is accomplished without having to make permanent changes to either the APIs of the new operating system or the legacy executable. The disclosed embodiment of the invention also supports changes the binary code of an executable while the executable is resident in the active process space of a computer system. The direct changes to binary code are performed in instances where an executable's problems cannot be fixed by the API redirection scheme.

Figure 1:
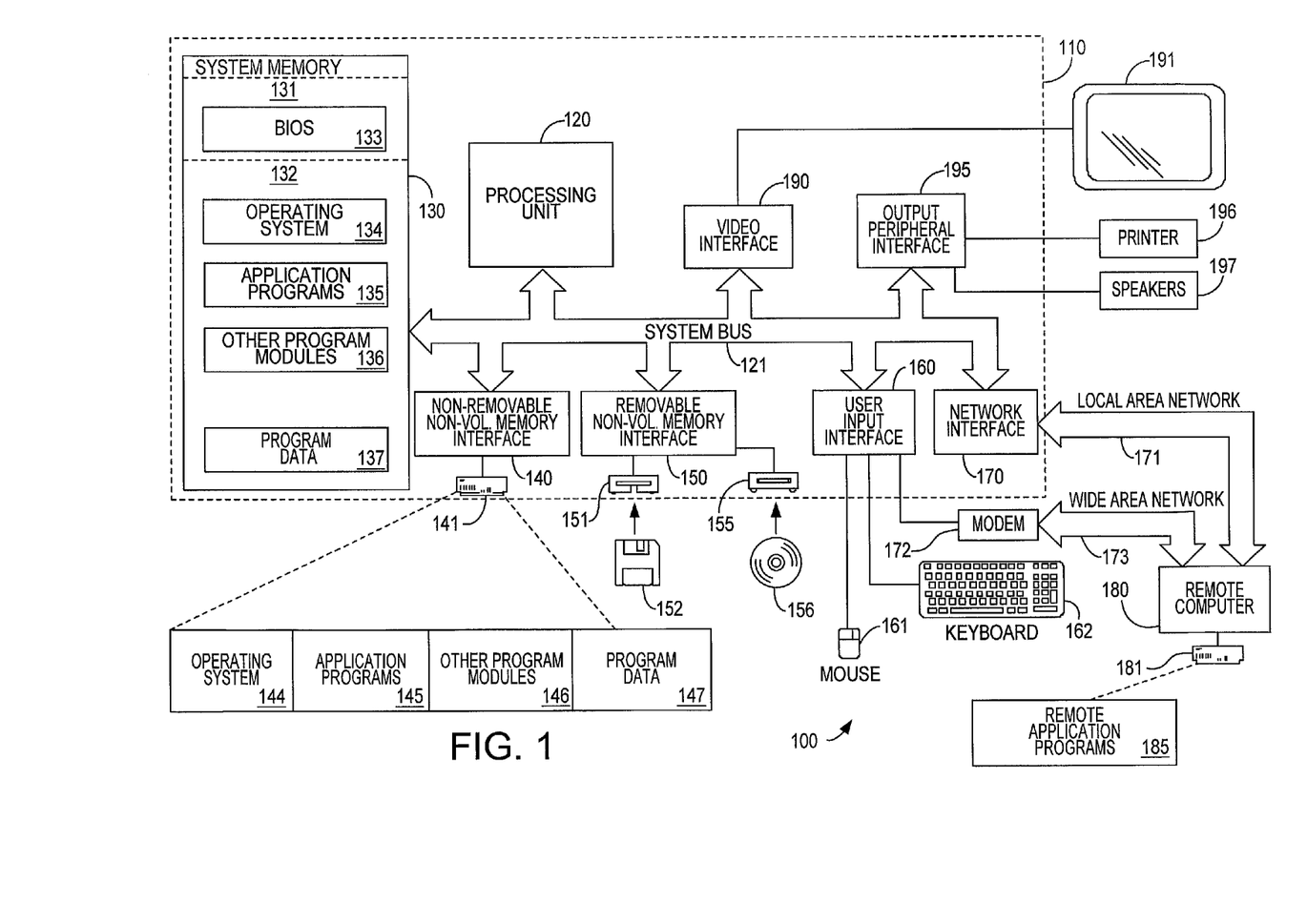
FIG. 1 is a schematic drawing illustratively depicting an exemplary operating environment for carrying out an embodiment of the present invention.

FIG. 1 illustratively depicts an example of a suitable operating environment 100 within which the invention may be implemented. More particularly, FIG. 1 illustratively depicts a computer system capable of incorporating and executing the functionality of the program modification database disclosed in detail herein below. The operating environment 100 is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like, either alone or in combination.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With continued reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, executable programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, executable programs 145, other program modules 146, and program data 147. Note that these components can either be the same as or different from operating system 134, executable programs 135, other program modules 136, and program data 137. Operating system 144, executable programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote executable programs 185 as residing on memory device 181. Those skilled in the are will appreciate that the network connections shown are exemplary and other means of establishing a communications link between the computers may be used.

Figure 2:
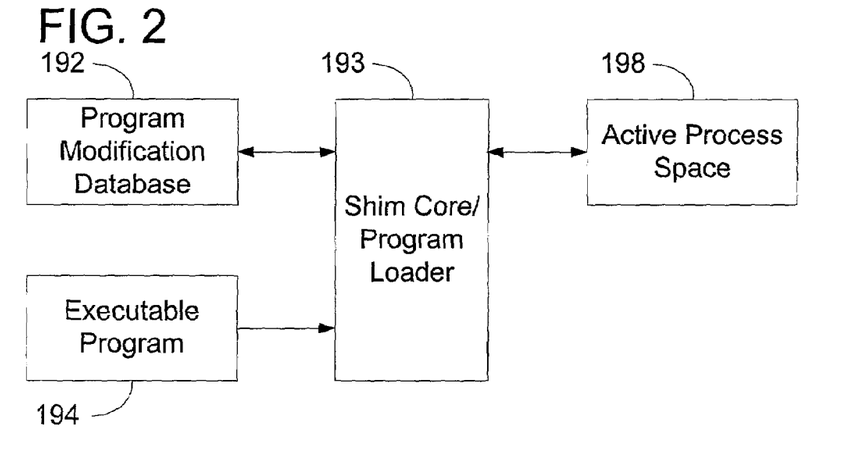
FIG. 2 is a schematic drawing depicting components of a program modification database-loader system embodying the present invention.

Having described exemplary computing environments in which the present invention is carried out, attention is directed to FIG. 2 that schematically depicts components of an illustrative embodiment of an executable loader-modification database system embodying the present invention. A program modification database 192 is a generalized depository of changes to be incorporated into executable programs by a shim core/program loader 193 at the time the executable programs are loaded for execution on a computer system. The program modification database 192, described herein below with reference to FIGS. 3 and 4, includes both actual substitute program segments as well as a set of executable program entries. Each of the executable program entries describes a set of changes for a corresponding executable program. As explained further herein below, the executable program entries also include instructions to include or exclude specified program changes under particular circumstances during execution of the corresponding executable program.

An executable program 194 is retrieved and parsed by the shim core/program loader 193 and compared to entries stored in the program modification database 192 to determine the existence of a corresponding entry contained therein. A method for carrying out such a search/comparison is described in Durr et al. U.S. patent application Ser. No. 09/801,950, filed Mar. 8, 2001, entitled: "A COMPUTER SYSTEM UTILITY FACILITATING DYNAMICALLY PROVIDING PROGRAM MODIFICATIONS FOR IDENTIFIED PROGRAMS," that is incorporated herein by reference in its entirety including all references contained therein to other publications.

Assuming that a corresponding entry is found in the database 192, the shim core/program loader 193 creates a substitution table identifying APIs referenced by the executable program 194 for which substitute APIs are specified. The substitution table, described in association with FIG. 6 herein below, is stored in an active process space 198 for fast retrieval while executing a copy of the executable program 194 (also stored in memory 198). The substitution table in memory 198 stores include/exclude rules associated with individual ones of the identified called APIs. Such include/exclude rules enable a system embodying the present invention to quickly determine whether to execute a substitute API in response to a call to a particular API from a particular program module (e.g., an identified DLL).

The active process space 198 includes two groups of APIs. First, the active process space 198 includes the group of APIs referenced by the executable program 194. Second, the active process space 198 includes a set of substitute APIs. During program loading, substitute APIs are retrieved from the program modification database and loaded into the active process space 198. The shim core/program loader 193 stores a corresponding reference to each substitute API in the substitution table.

The program loader incorporates, into the copy of the executable program 194 stored in process space 198, in-memory program patches specified by the entry in the database 192 corresponding to the executable program 194. The in-memory program patches comprise substitute bytes of information for the executable and are utilized, for example, in instances where a program error cannot be remedied by redirecting an API call to a substitute API.

The program modification database 192 and shim core/program loader 193 (a component of the core operating system) facilitate redirecting API calls associated with the executable program 194 to substitute APIs retrieved from the database 192 and stored in active process space 198. The in-memory program patching functionality of the shim core/program loader 193 enables direct substitution of bytes of information in an executable stored on a read-only data storage media (e.g., a CD ROM) and by-passing certain anti-tampering mechanisms by performing direct byte-matching/substitution in the program copy stored in the active process space 198.

Figure 3:
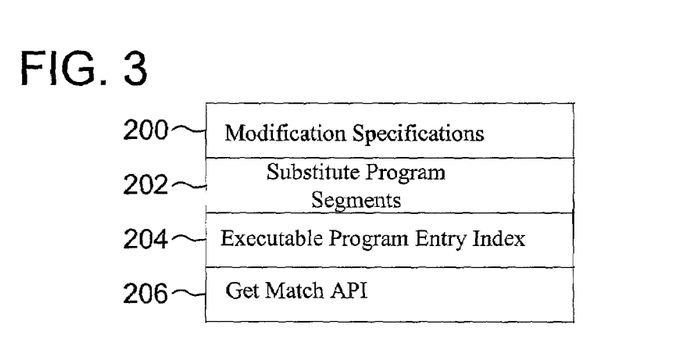
FIG. 3 is a schematic drawing depicting components of the program modification database embodying the present invention.

Turning to FIG. 3, the components of an illustrative embodiment of the program modification database 192 are schematically depicted. In an embodiment of the invention, the program modification database components identified in FIG. 3 are stored within a single file. However, in alternative embodiments, one or more of the program modification database components described herein below are stored within separate files. The program modification database components are, by way of example, stored within a read-only access file to prevent modification by unauthorized or unknowledgeable parties. Though depicted as distinct in FIG. 2, the individually identified components of the program modification database are not necessarily physically separate.

Modification specifications 200, described in greater detail below with reference to FIG. 4, include a set of executable program entries corresponding to programs for which modifications are specified in the database. Each executable program entry includes a program matching criteria and one or more references to substitute program segments. The program matching criteria comprises, by way of example, a set of designated tagged/typed values for a particular executable. In an embodiment of the invention, each program matching criteria is created from an extensible set of potential types of information supported by the program modification database 192. A particular matching criteria for an executable entry is preferably a combination of values of selected types that, in combination, uniquely identify a program.

In an embodiment of the present invention, references to substitute program segments within the executable program entries are "indirect references." Indirect references include for example: names, pointers or any other identification mechanism for locating a substitute program segment. In the illustrative embodiment of the present invention the indirect references comprise names that identify DLLs within substitute program segments 202 maintained as a distinct component of the program modification database that in turn contain/reference a set of substitute functions. However, in an alternative embodiment of the invention, "direct references" to substitute program segments comprise actual substitute program segments (e.g., DLLs and/or the contents thereof) stored within the individual executable program entries. Storing indirect references within the executable program entries enables an individual program segment to be referenced by multiple executable program entries. In cases where a large number of distinct applications require a particular substitute program segment (e.g., API), indirect references substantially reduce the size of the program modification database.

In an embodiment of the present invention, an executable program entry index 204 contains entries having at least one piece of information identifying an executable program for which a corresponding executable program entry exists in the modification specifications 200. By way of example, an entry within the executable program entry index 204 includes a set of bytes corresponding to at least a portion of a program name. More specifically, each entry in the executable program entry index 204 contains a set number of bytes (e.g., 8 bytes) corresponding to a program name, or the first portion of the file name in the event that the file name exceeds the number of bytes for a single index entry. By specifying a fixed number of bytes per entry, the executable program entry index 204 is maintained in the form of a packed data structure that is easily traversed in view of the consistent index entry size. Alternatively, the index 204 comprises any of a number of different types of information relating to executable program files, and/or a non-packed/variable length data structure is utilized to carry out the index 204. In addition to the identifying information, each index entry also includes a second field referring to an executable entry within the modification specification file 200. The index 204, in an embodiment of the present invention, is created from a compiled XML definition of the modification database (see, e.g., FIG. 4) and stored within the file containing the components identified in FIG. 3.

The index 204 facilitates relatively fast determination of potential candidate entries in the modification specifications 200. After applying a program name to the index entries, the resulting set of remaining candidate entries is likely to be very small, and the small resulting set is compared to additional program information to identify an existing matching entry within the modification specifications 200. Since most programs will not require program segment substitution, the index 204 generally reduces delays in determining that a particular executable program is not represented in the modification specifications 200. Furthermore, by narrowing the search of the modification specifications 200 for a completely matching entry, the index 204 generally facilitates reducing search times for locating matching entries in the event that an entry exists in the modification specification file corresponding to a loaded program. Retrieval of relevant information from the modification specifications 200 is limited to the relatively small number of candidate executable program entries identified from a search of the index 204 entries, and the number of actual pages of data retrieved from secondary memory into RAM to complete the search is generally reduced.

A get match API 206 executes a sequence of functions to identify an entry within the modification specifications. In general, the get match API 206 initially searches the index 204 to identify potential executable entries in the modification specification file 200. Thereafter, characteristics of an executable program file are compared to the matching criteria of each potential executable entry in the modification specification file 200 to identify a match.

Figure 4:
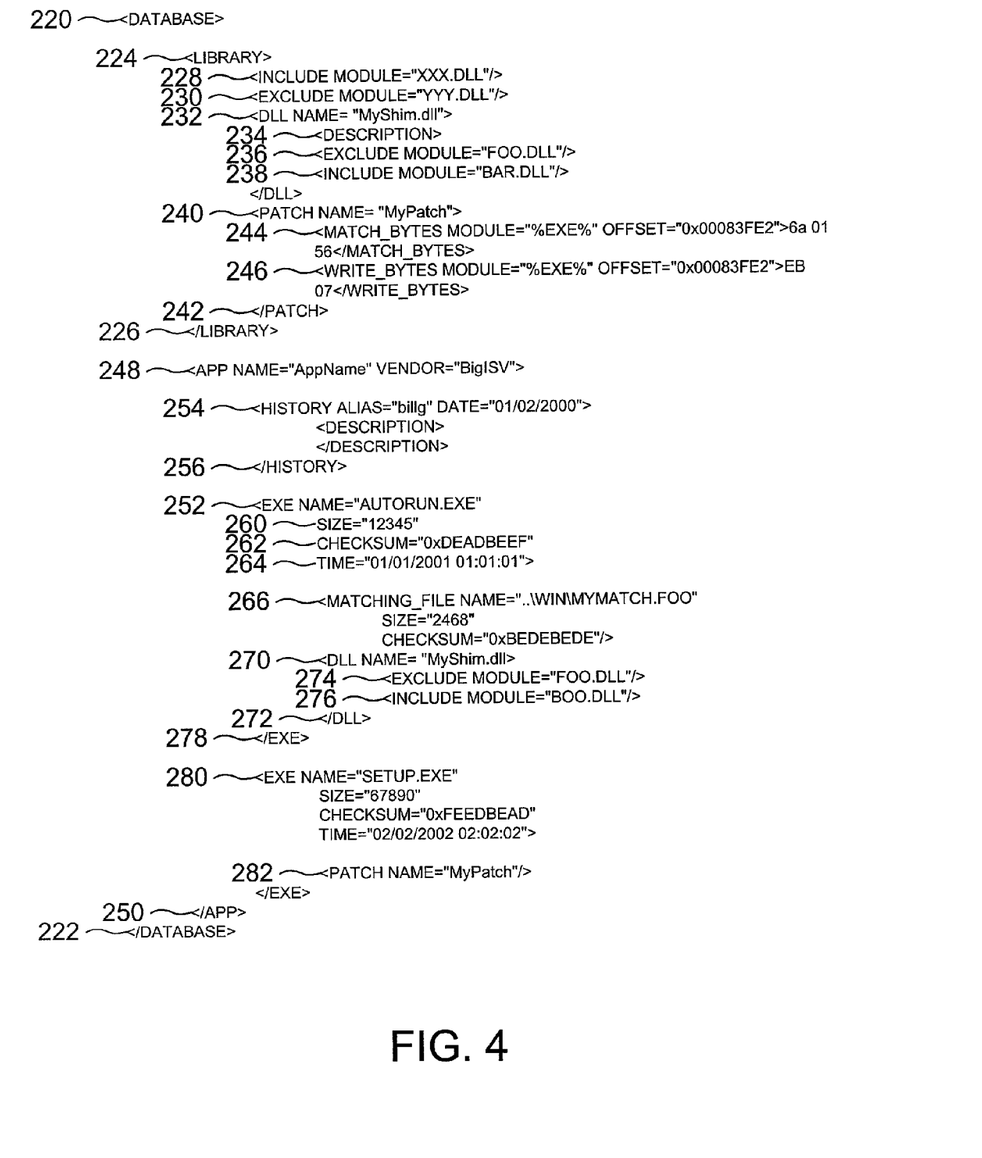
FIG. 4 is an exemplary (XML) definition for a file structure containing a program segment substitution library and executable program entries for the program modification database.

Turning now to FIG. 4, an exemplary format is provided for the modification specifications 200. In the illustrative embodiment of the present invention, the modification specifications 200 comprise XML tagged data arranged according to certain basic formatting rules. In alternative embodiments of the invention, the modification specifications 200 identify executable programs and related program segment substitutions using other names and/or formats. The modification specifications 200 include a set of tagged data fields. Those skilled in the art will readily appreciate that the choice of tag names is a matter of design choice. Furthermore, the content and form of the tagged fields for the modification specifications 200 is exemplary and is modified in alternative embodiments of the present invention.

While not depicted in FIG. 4, the modification specifications 200 begin with an XML version declaration tag (e.g., <?xml version=" 1.0"?>). The XML version tag resides at the beginning of the file containing the modification specifications 200 and enables the file to be recognized as an XML file. A <DATABASE> tag 220 and a </DATABASE> tag 222 bracket the substantive portions of the modification specifications 200.

After the <DATABASE> tag 220, a <LIBRARY> tag 224 and a </LIBRARY> tag 226 delimit a library section that specifies, by name, hook DLLs and patch files as well as INCLUDE and EXCLUDE declarations. The library section comprises any number (including none) of the aforementioned INCLUDE, EXCLUDE, DLL and PATCH entries, and the entries reside in any order within the library section. However, in an embodiment of the present invention, the INCLUDE and EXCLUDE entries precede the DLL entries (which may themselves have INCLUDE and EXCLUDE entries), and the PATCH entries are placed last in the library section. An INCLUDE tag 228 or an EXCLUDE tag 230 has one required attribute, MODULE. The MODULE attribute specifies a module whose calls should be globally included or excluded from program modification. The INCLUDE tag 228 or the EXCLUDE tag 230 is overridden by a more particularized EXCLUDE/INCLUDE tag associated with a particular application/executable entry or DLL entry. Thus, an EXCLUDE/INCLUDE declaration in the library section, while global in scope with regard to the modification specifications 200, has the lowest priority in determining precedence of EXCLUDE/INCLUDE declarations applicable to a particular executable program. In an embodiment of the present invention, the global list of EXCLUDE/INCLUDE declarations only contains EXCLUDE entries that refer to operating system DLLs. Single-API excludes are placed in more specific portions of the modification specification file outside the library. The PATCH entry also includes a specification of the bytes that need to be located in the named dll within a <MATCH_BYTES MODULE> tag 244. The PATCH entry also includes a specification of the byte that will replace the located bytes. The replacement bytes are provided in a

```
<WRITE_BYTES MODULE>tag 246. The following is an example of a PATCH entry
within a file containing modification specifications 200.
    <PATCH NAME="MyPatch">
        <DESCRIPTION>
            This is the description of the MyPatch patch
        </DESCRIPTION>
        <MATCH_BYTES MODULE="%EXE%" OFFSET="0x00083FE2">6a 01
            56</MATCH_BYTES>
        <WRITE_BYTES MODULE="%EXE%" OFFSET="0x00083FE2">EB
            07</WRITE_BYTES>
    <PATCH>
```

(e.g., under a DLL tagged section). EXCLUDE/INCLUDE precedence is discussed further herein below with reference to a portion of the database section delimited by an <EXE> tag 252 and an </EXE> tag 258. By way of example, an <INCLUDE> or <EXCLUDE> tag is terminated with a "1>" combination of characters. The following are examples of EXCLUDE and INCLUDE tags:

<EXCLUDE MODULE="FOO.DLL"/>
    <INCLUDE MODULE="BOO.DLL"/>

A DLL tag 232 has one required attribute, NAME. The NAME attribute specifies a filename of a DLL included in the library. A DLL tag in the scope of the LIBRARY section names a dynamically linked library that is included within the database when the XML definition is compiled. In an embodiment of the invention, the DLLs and all other substitute program segments 202 are stored within a same file as the modification specifications 200. Including the substitute program segments 202, including DLLs, which are typically not very large, within a single file that also contains the modification specifications 200 allows client computer systems to be updated easily because all of the necessary components to fix an executable program are contained with a single database file. The single database file is, by way of example, shipped with the operating system and/or downloaded in the form of an operating system update. In alternative embodiments of the invention, the substitute program segments 202 are stored in one or more files distinct from a file containing the modification specifications 200.

A DLL tag requires a terminating </DLL> tag and optionally includes a number of additional tags. Examples of additional tagged fields under a DLL tag are a description under a <DESCRIPTION> tag 234 (terminated by </DESCRIPTION>, and include and exclude declarations such as an EXCLUDE tag 236 and an INCLUDE tag 238. The following is an example of a DLL entry for the modification specifications 200.

<DLL NAME="MyShim.dll">
      <DESCRIPTION>
        (This is the description of the MyShim dll)<
      </DESCRIPTION>
      <EXCLUDE MODULE="FOO.DLL"/>
      <INCLUDE MODULE="BAR.DLL"/>
    </DLL>

In the illustrative embodiment of the modification specifications 200, a patch entry is delimited by a <PATCH> tag 240 and </PATCH> tag 242. The <PATCH> tag 240 includes one required attribute, NAME. The <PATCH> tag 240 specifies the name of the PATCH as it will be referenced A patch is executed by matching bytes in memory with the specified MATCH_BYTES to ensure that what resides in memory is what you expect and then overwriting the matched bytes with bytes specified by the <WRITE_BYTES MODULE> tag 246. All bytes are specified as two-digit hex. Offsets are relative to the base address of the module specified by the MODULE attribute. % EXE % is an alias for the main executable module.

An <APP> tag 248 identifying a particular program name is optional and is not used to locate a match in an embodiment of the present invention. In the exemplary embodiment of the present invention, an <EXE> tag 252 is placed within a portion of the modification specifications 200 delimited by the <APP> tag 248 and </APP> tag 250. However, in other instances of the modification specifications 200, the <EXE> tag 252 is placed under the <DATABASE> tag 220. However, the <APP> tag 248 is a useful way of tying together all the executables associated with a software application product, including perhaps the installer, the main application executable program, and various tools or subsidiary executables.

A portion of the modification specifications 200 delimited by the <APP> tag 248 and </APP> tag 250 contains one or more <EXE> tags. The <APP> tag 248 includes a NAME attribute and a VENDOR attribute. A history entry within an APP entry is delimited by a <HISTORY> tag 254 and a </HISTORY> tag 256. The portion of the APP entry within the history delimiter tags 254 and 256 is a comment field that records creators and/or modifiers of an executable program modification and a summary of the modification(s). The history entry, if properly maintained, informs a program manager of an executable program problem and changes to other software (e.g., an operating system) that created the problem. In cases where generic modifications (also referred to herein as "shims") are applied (e.g. version lying, 2 GB free space problem), it is sufficient to list the problem, and the reader can refer to the description of the substitute program segment as it is found in the library.

The <EXE> tag 252 is a special default "matching" tag for an executable program entry in the program modification database. The <EXE> tag 252 identifies a specific executable that needs to be modified (e.g., shimmed or patched), and specifies the modules (e.g., DLLs specifying hook API/substitute functions for hooked functions) or patches to apply to the executable. The portion of the modification specifications 200 delimited by the <EXE> tag 252 and </EXE> tag 258 contains any number of optional <MATCHING_FILE> tags, <DLL> tags, and/or <PATCH> tags.

The <EXE> tag 252 has one required matching criteria parameter, NAME. It is however contemplated that a number of additional matching criteria are specified to ensure that a particular executable entry within the program modifications 200 corresponds to a particular executable that is to be modified. In the exemplary embodiment of the present invention, the <EXE> tag 252 includes three optional matching parameters, SIZE 260, CHECKSUM 262, and TIME 264. Each of these parameters is used to verify the applicability of an designated executable modification to a subject program. SIZE is the size of the executable in bytes. CHECKSUM is a calculated checksum determined for the subject program. TIME is a human-readable creation time of the subject program, in UTC (GMT), in the form MM/DD/YYYY HH:MM:SS. These parameters comprise an exemplary portion of a matching criteria for a program entry.

The <EXE> tag 252 is a default "matching_file" tag that is included in each executable program entry in the program modification database. A <MATCHING_FILE> tag 266 is an optional matching file tag that, like the <EXE> tag 252 is capable of having any of a number of matching parameter types and their corresponding values specified. The <MATCHING_FILE> tag 266 facilitates checking other files near the executable to ensure a valid match (i.e., guard against potential false positives). The files are first checked relative to the executable's directory and then in the current working directory (the directory within which the parent process resides—if there is a parent process). For example, if the "SETUP.EXE" program on the CD-Rom root directory E:\ unpacks an installer into C:\WINNT\TEMP\, then executes the installer, a database matching system will check for matching files in (or relative to) both C:\WINNT\TEMP\ and E:\. By way of example the matching file name contains a relative path. However, the matching file name does not contain a drive designator because the target machine may assign different letters to relevant drives. The <MATCHING_FILE> tag 266 is terminated by "/>" in an exemplary embodiment of the present invention.

In the scope of the <EXE> tag 252, a <DLL> tag 270 names a DLL that should be applied to identified EXE. The identified DLL includes substitute program segments (e.g., APIs) to be unpacked and incorporated into an executable that meets the matching criteria specified at least in part by the <EXE> tag 252. A </DLL> tag 272 terminates the DLL entry. The DLL identified within the tagged DLL entry is declared in the <LIBRARY> section of the modification specifications 200. While not included in the illustrative XML definition of FIG. 4, a DLL tagged entry includes an optional command line enabling a DLL entry for a particular executable program to specify options modifying the behavior of the DLL for the particular executable program such as activating options and applying particular fixes. This enables a single DLL declared above in the Library section of the XML definition to be used in different ways by executable programs without having to store multiple copies of the DLL in the modification database. The following is an example of an EXE entry having a DLL tagged entry including a command line.

<EXE NAME="setup.exe" ID="{46F3E4DE-B668-46EC-B9B8-2D05891300F7}">
      <MATCHING_FILE NAME="Bingo.bmp"/>
      <MATCHING_FILE NAME="premium.hlp"/>
      <DLL NAME="CorrectFilePaths.dll" COMMAND_LINE="-f -s -p winhelp;winhlp32"/>
   </EXE>

Optional <EXCLUDE> tag 274 and <INCLUDE> tag 276 are inserted between the <DLL> and </DLL> tags 270 and 272. Though not depicted in the exemplary XML description, INCLUDE and EXCLUDE policy statements are includable within the scope of an <EXE> tag outside the scope of any particular <DLL> tagged entry. The order of precedence for INCLUDE and EXCLUDE policy statements is in reverse of their appearance in the file. A substitute program segment loader system walks the list in reverse order and the first INCLUDE or EXCLUDE that matches on all provided attributes determines whether the modification is excluded or included. For this reason, it is important to order INCLUDES and EXCLUDES within the modification specifications 200 from generic to specific to ensure that specific are encountered first. The EXE entry is terminated by an </EXE> tag 278.

In the scope of an <EXE> tag 280, a <PATCH/> tag 282 names a patch file declared above in the <LIBRARY> section. The above-described <INCLUDE> and <EXCLUDE> tags are not valid for <PATCH> tags, and the PATCH is applied to the applicable program once at load time and can't be turned off and on via include/exclude statements.

The following is an example of a file portion delimited by the <APP> tag 248 and </APP> tag 250.

```
<APP NAME="AppName" VENDOR="BigISV">
    <HISTORY ALIAS="billg" DATE="01/02/2000">
        <DESCRIPTION>
        -Windows 95 version lying.
        -2GB disk free space problem.
        -App was putting its start menu items in the user-specific folder, but
        uninstalling them from the common folder. It was shimmed so that it installs
        its items to the common folder.
        </DESCRIPTION>
    </HISTORY>
    <HISTORY ALIAS="steveb" DATE="02/13/2000">
        <DESCRIPTION>
            App wasn't getting focus in certain startup scenarios.
            Forced SetWindowForeground to succeed.
        </DESCRIPTION>
    </HISTORY>
    <EXE NAME="AUTORUN.EXE"
        SIZE="12345"
        CHECKSUM="0xDEADBEEF"
        TIME="01/01/2001 01:01:01">
```

-continued

```
        <MATCHING_FILE NAME=". . .\WIN\MYMATCH.FOO" SIZE=
        "2468"
                CHECKSUM="0xBEDEBEDE"/>
        <DLL NAME="MyShim.dll">
            <EXCLUDE MODULE="FOO.DLL"/>
            <INCLUDE MODULE="BOO.DLL"/>
        </DLL>
    </EXE>
    <EXE NAME="SETUP.EXE"
        SIZE="67890"
        CHECKSUM="0xFEEDBEAD"
        TIME="02/02/2002 02:02:02">
        <PATCH NAME="MyPatch"/>
    </EXE>
</APP> {End of APP tagged entry in modification specifications 200}.
```

Figure 5:
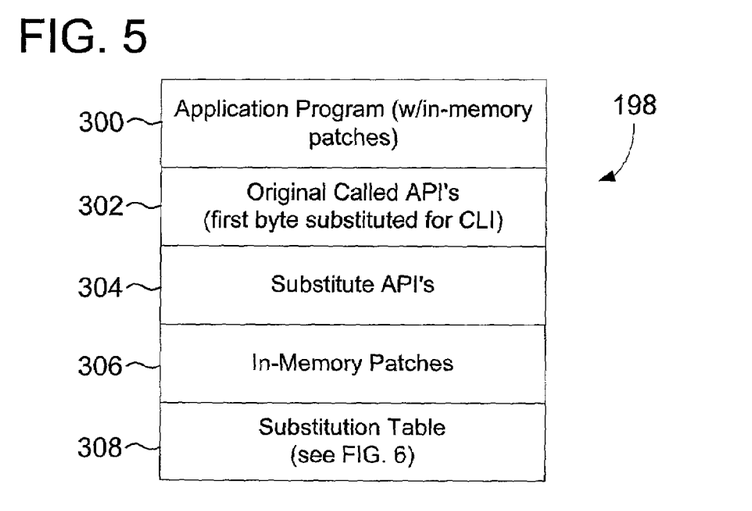
FIG. 5 is a schematic depiction of components of a process space comprising the executable and substitution table components of a program loaded in accordance with an embodiment of the present invention.

Having described an exemplary modification specification file 200, attention is directed to FIG. 5 that provides a schematic summary of components within the active process space 198 for a loaded executable. An executable program component 300 represents the portion of the active process space allocated to store the loaded executable program. This portion of memory will also store at least a portion of in-memory patch data specified for the loaded executable program. An original set of called APIs, stored by way of example within DLLs, comprise an original called APIs component 302 of the active process space 198. In an embodiment of the present invention, the first byte of each API for which a substitute API exists is replaced by a CLI instruction to ensure redirection of program execution to the shim core component of the shim core/program loader 193 whenever a substitution candidate API is called by the copy of the executable program 194 stored in the executable program component 300.

Next, a substitute APIs component 304 of the active process space 198 stores a set of substitute APIs specified by the program modification database 192 for the selected executable program 194. The substitute APIs are, by way of example, stored within a DLL. However, the APIs are alternatively stored as individual components or grouped in files other than DLLs.

In many instances, an in-memory patch does not fit within the physical memory space previously occupied by the bytes of executable code that the in-memory patch replaces. In such instances, a reference is inserted into the executable program component 300 where the in-memory patch is to begin. The reference points to a portion of an in-memory patches component 306 where the actual patch bytes are stored.

A substitution table component 308 of the active process space 198 stores a table that comprises data for correlating called APIs to substitute APIs. The substitution table component 308 further includes the byte of each API replaced by the CLI instruction (to create an exception condition). Since exclusions can be specified for APIs identified in the substitution table, a further entry identifies the include/exclude instructions associated with the particular API. The contents of the substitution table are discussed herein below with reference to FIG. 6.

Figure 6:
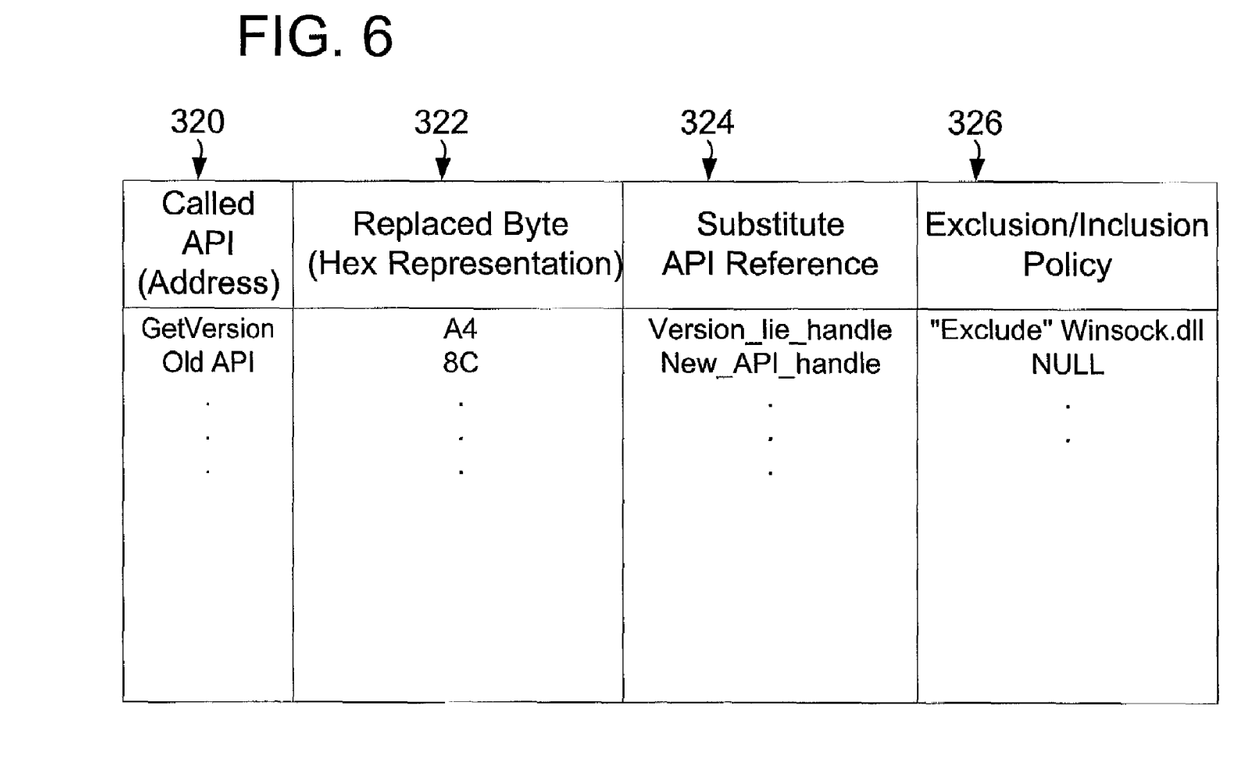
FIG. 6 schematically depicts components of a substitution table comprising references to substituted components of an executable program modified by a program loader routine in accordance with an embodiment of the present invention.

Turning to FIG. 6, a schematic drawing of a table for storing information relating to substituted program segments (e.g., APIs) is provided. This table corresponds to the information stored within the substitution table component 308 of the active process space 198. A "Called API" column 320 stores information identifying an API for each substitution candidate API. Though text strings are used in FIG. 6, in an embodiment of the present invention, the identifying information is an address of the API since this data is registered when a CLI instruction is executed. In alternative embodiments of the invention, the identifying information can be handles, index values, text strings, etc. Regardless of form, the purpose of the identifying information in the "Called API" column 320 is to enable the shim core/program loader 193 to determine the API call that generated the CLI exception condition.

A replaced byte column 322 stores the single byte overwritten by the CLI instruction in the original API. As mentioned previously above, in a particular embodiment of the present invention API substitution is not an all or nothing proposition. Execution of a particular substitute API may occur under only particular conditions (e.g., when called by a particular routine). Saving the replaced byte of each original API in the replaced byte column 322 facilitates easy reconstruction of the original API for instances where API substitution is excluded.

A "substitute API" column 324 stores a reference to a substitute API corresponding to an original API identified in the "Called API" column 320. Though text strings are depicted in FIG. 6, in an embodiment of the present invention a handle corresponding to a substitute API is stored within each entry. The handle is used to locate the corresponding substitute API in the substitute APIs component 304 of the active process space 198. In alternative embodiments of the invention, the identifying information comprises memory addresses, text strings, index values, etc. The purpose of the reference stored in the "substitute API" column 324 is to enable the shim core/program loader 193 to locate the substitute API code stored within the active process space 198.

An exclusion/inclusion policy column 326 stores conditions under which API substitution should occur or not occur. In an embodiment of the invention, the contents of an entry within the policy column 326 comprise an ordered list of conditions (e.g., routines or modules that call the API containing the CLI), and an associated direction to include or exclude substitution when the condition is met. Due to the ordering of the list by precedence, the first list entry for which a condition is met controls whether to substitute for the originally called API. In an embodiment of the invention, if no conditions are present in an entry within policy column 326, then substitution for the originally called API is unconditionally performed.

Figure 7:
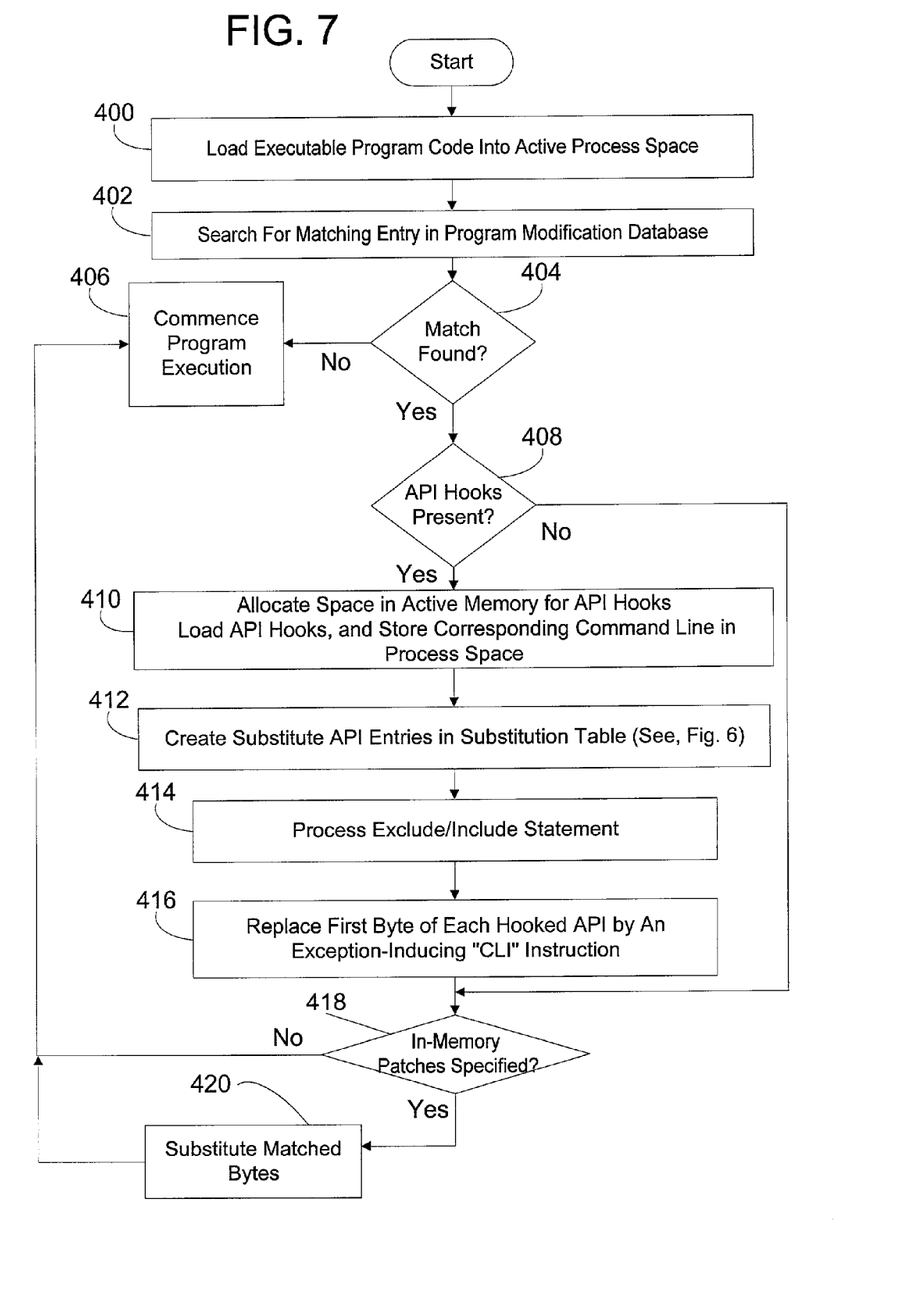
FIG. 7 is a flowchart summarizing a set of steps for loading a program in accordance with an embodiment of the present invention.

Having described an exemplary system embodying the present invention, attention is now directed to FIG. 7 that summarizes a set of steps for loading an executable program in accordance with an embodiment of the present invention. In response to a user selecting a particular program for execution on a computer system embodying the present invention, control passes to step 400. During step 400 the shim core/program loader 193 requests sufficient memory for the program from the computer system and then reads the binary code and data for the program into the allocated memory space (executable program component 300) in the active process space 198. In prior systems that do not support dynamic substitution of program code, the computer system executes the program. However, in an embodiment of the present invention, further program loading steps are performed to facilitate program segment substitutions for a program having a corresponding entry in the program modification database 192.

While not specifically noted in the steps depicted in FIG. 7, the shim core/program loader 193 initializes the program modification database 192. It is possible for the database 192 to be absent in some systems. In the case where the database 192 is not present, the operating system executes the program in the manner that prior systems execute programs. However, assuming the program modification database 192 exists in the computer system, control passes from step 400 to step 402.

In an embodiment of the present invention, during step 402 the shim core/program loader 193 calls a search function of the program modification database 192 (e.g., TrGetMatchingExe( )) to search for a matching entry contained therein. Additional details of the program modification database 192 and a method for identifying entries within the database at the time a program is loaded for execution are described in Durr et al. U.S. patent application Ser. No. 09/801,950, filed Mar. 8, 2001, entitled: "A COMPUTER SYSTEM UTILITY FACILITATING DYNAMICALLY PROVIDING PROGRAM MODIFICATIONS FOR IDENTIFIED PROGRAMS," which is incorporated herein by reference in its entirety.

Next, during step 404, if the search function returns a message indicating that no matching entry exists within the database 192, and thus there are no substitute program segments (e.g., functions/APIs or in-memory patches) specified for the program loaded during step 400, then control passes to step 406 wherein the operating system executes the loaded program without modifications to the original loaded program code. If however, a matching entry is found for the loaded program, then control passes to step 408.

Before describing step 408, the contents of modules that specify replacement functions for existing APIs are briefly described. In the disclosed exemplary embodiment of the invention, API hook descriptions are collectively stored within modules containing the substitute functions (e.g., APIs). In the exemplary embodiment, the modules are DLLs (referred to herein as "hook DLLs"). The "MyShim.dll" referenced by the <DLL> tag 270 in FIG. 4 is an example of such a module. Within the hook DLLs, API hook descriptions include: (1) the name of a module (e.g., DLL) containing an original function (e.g., API) that needs to be modified in some manner, (2) the name of the original function, and (3) a substitute function identification (e.g., name). In an alternative embodiment of the invention, the API hook descriptions and replacement functions are individually identified within the database rather than grouping them within a hook DLL.

During step 408, the shim core/program loader 193 queries the database 192 to determine whether API hooks corresponding to the loaded executable program exist. If during step 408 the shim core/program loader 193 determines the database 192 specifies API hooks (e.g., one or more hook DLLs) for the loaded program, then control passes from step 408 to step 410.

During step 410 additional memory is allocated from the computer system's heaps (e.g., active program memory) for each API hook DLL present in the database that applies to the loaded program. The shim core/program loader 193 calls the database 192 and the applicable hook DLLs are copied into the allocated memory space (e.g., 304). As previously mentioned with reference to FIG. 4, the database 192 stores a command line for each hook DLL tagged entry. During step 410, the shim core/program loader 193 reads, parses and stores the parsed contents of the command line for later use by the hook DLL. The command line enables customizing a hook DLL for use with a particular executable program. The customization instructions are specified by the hook DLL in the form of options within the command line. The parsed command line instructs the shim core/program loader 193 with regard to particular options to activate and fixes to apply.

Next, during step 412, a set of entries are created in the substitution table (see, e.g., FIG. 6). Each table entry corresponds to an API for which a substitute API is specified by a hook DLL loaded during step 410. The shim core/program loader 193 calls a function (e.g., GetHookAPIs( )) within each hook DLL located and loaded during step 410. The GetHookAPIs( ) function reports the number, and a description for each, of APIs that are hooked by the hook DLL. The number of API hooks establishes the number of additional entries needed within the substitution table for the hook DLL. The description of each API includes a module containing a defective (hooked) API, a name of the API, and an identification (e.g., address) of a substitute API. After obtaining and storing the API hook information for entries in the substitution table, during step 414 the program modification database 192 is queried to determine the inclusion/exclusion policies that apply to the substitute APIs for an identified hook DLL. The policies are stored in column 326 of the substitution table 306 and define the scope of redirecting function calls to substitute APIs. If no policy is specified for an API, then the particular called API is redirected without regard to the program module from which the redirected API call arose. By way of example, a null value is stored to indicate the absence of any limits on redirecting calls based upon the origin of the calls to the hooked API.

Limiting the scope of substitute APIs is important because in many cases an API hook cannot be universally applied to all components of an executable program. For example, an executable program using the network and relying on another operating system component winsock.dll may need to hook the operating system API "GetVersionEx( )." A GetVersionEx( ) API hook is necessary when executing a program in, for example, later versions of the WINDOWS operation system if the program checks the version of the operating system and refuses to run if the GetVersionEx( ) API does not report that the operating system is Windows 98. The redirection scheme proposed in the illustrative embodiment of the invention allows misreporting the operating system version to the executable program to avoid unintended shutdown of the program.

However, the proposed redirection scheme maintains the ability to execute the hooked API (rather than the substitute API) when redirection is not desired or not necessary. With reference to the first row of the substitution table of FIG. 6, an "EXCLUDE" statement within the scope of a particular DLL tag containing the API hook enables bypassing the substitute API to avoid misreporting the operation system version to the winsock.dll (misreporting the version prevents the network components of the program from working correctly). After processing include/exclude statements during step 414, control passes to step 416.

During step 416, the address of each hooked API in the executable is determined (and stored in the table), and the first byte of the hooked APIs is replaced with a CLI instruction. The replaced byte is stored within the appropriate entry in the substitution table component 306. The CLI instruction creates an exception condition handled by the operating system. Handling the CLI exception is discussed herein below with reference to FIG. 8. Control then passes to step 418. If no hook DLLs are specified for the loaded executable, as determined during step 408, then control passes to step 418.

An in-memory patch consists of operation code and data that alter performance of an executable. By way of example, an in-memory patch replaces certain specified bits of an executable with other specified substitute bits. The patches may comprise replacement bytes directly substituted into the memory locations of original executable memory bytes. Alternatively, links are established between the original program memory and the in-memory patches.

During step 418, if no in-memory patches are specified for the executable program 194, then control passes to step 406 and the program is executed. However, if in-memory patches are specified for the loaded executable, then control passes from step 418 to step 420.

During step 420 the shim core/program loader 193 processes in-memory patches present in the database entry for the executable program 194. The shim core/program loader 193: (1) determines the number of patches present in the database for the executable program 194; (2) determines the size of each patch via a call to the program modification database 192; (3) requests space in the active process space 198 from the operating system; and (4) loads the patch into the process space 198. After all of the patches that apply to the executable program 194 are processed, control passes to step 406 wherein the executable program is executed.

It may be the case that certain bits of an executable can only be replaced if they exist at a certain address or even they can only be replaced when they exist. In an embodiment of the invention, the shim core/program loader 193 implements a patch pre-processor that understands the language of pre-processing commands specified for in-memory patches.

Figure 8:
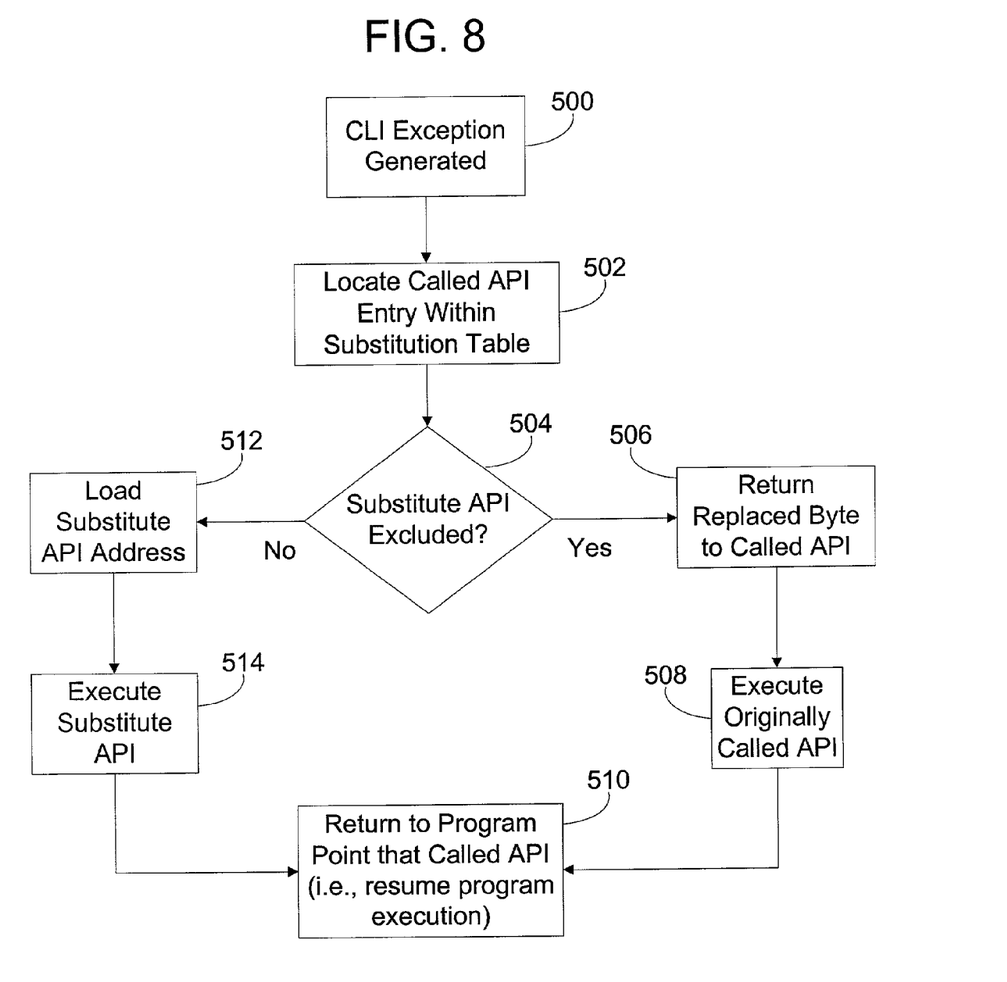
FIG. 8 is a flowchart summarizing a set of steps performed during execution of an API call for which a substitute API is provided in accordance with the present invention.

Turning to FIG. 8, the steps are summarized for handling a CLI exception by the shim core/program loader 193. During step 500, the executing program encounters a CLI instruction when a hooked API is called (note: the CLI instruction replaces the first byte in a hooked API). The handler routine for the CLI exception determines that the exception relates to a hooked API and passes the memory address where the CLI was encountered to the shim core/program loader 193 to handle the exception. The handler routine also passes the identity of the program module that called the hooked API. The "calling module's" identity is utilized by the shim core/program loader 193 to determine whether to execute the substitute API in place of the called API. Control then passes to step 502.

During step 502, the shim core component of the shim core/program loader 193 compares the address to corresponding data in the "called API" column 320 of the substitution table component 306 to identify a corresponding substitute API entry. After locating the proper API entry within the substitution table, control passes to step 504 wherein the shim core applies the calling program module's identity (e.g., DLL name) to an exclude/include policy stored in column 326 for the hooked API entry. If the shim core/program loader 193 determines that the substitute API is excluded because of the calling module's identity, then control passes to step 506. During step 506, the shim core replaces the substituted byte from column 322 in the original called API. Thereafter, the originally called API is executed during step 508. Control then passes to step 510 wherein the CLI exception handling is completed and program control returns to the point of the executing program that called the conditionally hooked API.

If however at step 504, the shim core determines that the substitute API is not excluded, then control passes to step 512. During step 512 the shim core provides the substitute API address (e.g., by supplying the substitute API handle in the proper hook DLL) to the operating system. Control then passes to step 514 wherein the substitute API executes on the computer system. Control then passes to step 510.

Illustrative embodiments of the present invention and certain variations thereof have been provided in the Figures and accompanying written description. The program modification database and shim core/program loader architecture represents a depository of program fixes and other modifications that are incorporated into previously released executable programs at the time a program is executed. A method is also disclosed for loading and executing an executable program in accordance with an illustrative embodiment of the invention. The present invention is not intended to be limited to the disclosed embodiments. Rather the present invention is intended to cover the disclosed embodiments as well as others falling within the scope and spirit of the invention to the fullest extent permitted in view of this disclosure and the inventions defined by the claims appended herein below.

What is claimed is:

1. A method for loading an executable program and associated modification code segments, the method comprising the steps of:

receiving a set of original program segments referenced by the executable program, each of the set of original program segments comprising executable binary code;

identifying a set of substitute program segments associated with ones of the original set of program segments;

modifying executable binary code of the ones of the original set of program segments to include an exception inducing code, the exception inducing code comprising executable binary code; and creating an association between ones of the set of original program segments and ones of the set of substitute program segments, each association comprising a program matching criteria for determining whether to execute the substitute program segment depending on an identity of a calling module of the original program segment.

2. The method of claim 1 wherein the substitute program segments comprise functions.

3. The method of claim 2 wherein the functions comprise application program interfaces.

4. The method of claim 3 wherein the application program interfaces are part of an operating system.

5. The method of claim 1 wherein the creating an association step comprises building a table entry including a called original program segment reference and a substitute program segment reference.

6. The method of claim 5 wherein the called original program segment reference comprises an address.

7. The method of claim 5 further comprising storing a portion of the original program segment replaced by the exception inducing code in table entry.

8. The method of claim 5 further comprising storing a condition description specifying a program execution state under which a substitute program segment will not be executed in place of an associated called original program segment.

9. The method of claim 1 wherein the identifying step comprises searching a program modification database including a set of identified programs and corresponding substitute program segments.

10. The method of claim 1 further comprising the steps of:
    loading the executable program into active process space;
    identifying an in-memory patch within the program modification database corresponding to the executable program; and
    inserting the in-memory patch within the executable program residing in the active process space.

11. A method for loading an executable program comprising executable binary code and having associated modification code segments, the method comprising the steps of:
    loading, for execution, a copy of the executable program in active process space;
    identifying a set of modifications corresponding to the executable program; and
    modifying executable binary code of the copy of the executable program in active process space to include an exception inducing code, wherein the exception inducing code comprises executable binary code that induces execution of an exception handling routine for determining and executing at least a corresponding one of the set of modifications; and associating, with each of the set of modifications, a program matching criteria for determining whether to execute the modified executable binary code depending on an identity of a calling module of the modified executable binary code.

12. A method for implementing execution of substitute program segments associated with an active executable program, the method comprising the steps of:
    calling, from a calling module having an identity, an original program segment of the active executable program that has been modified to include a previously placed exception inducing code, the previously placed exception inducing code comprising executable binary code that induces an exception handled by an exception handling routine;
    detecting the previously placed exception inducing code;
    determining a corresponding substitute program segment entry in a program segment substitution list;
    determining whether to execute a substitute program segment associated with the corresponding substitute program segment entry depending on the identity of the calling module; and
    if so determined executing the substitute program segment in place of the original program segment.

13. The method of claim 12 wherein determining whether to execute a substitute program segment comprises determining, by reference to an exclusion/inclusion policy associated with the instance of the exception inducing code, whether to perform the substitute program segment in place of the original program segment, wherein the exclusion/inclusion policy identifies at least a condition depending on the identity of the calling module under which the corresponding substitute program segment will not be executed in place of an associated original program segment.

14. The method of claim 13 wherein the corresponding substitute program segment entry includes a portion of the original program segment replaced by the exception inducing code, and further comprising the step of determining that the condition under which the corresponding substitute program segment will not be executed has been fulfilled, and in response restoring within a program code execution stream the portion of the original program segment replaced by the exception inducing code.

15. The method of claim 12 wherein the substitute program segments comprise functions.

16. The method of claim 15 wherein the functions comprise application program interfaces.

17. The method of claim 16 wherein the application program interfaces are part of an operating system.

18. The method of claim 12 wherein the corresponding substitute program segment entry includes a called original program segment reference and a substitute program segment reference.

19. A computer readable storage medium having computer-executable instructions for facilitating loading an executable program and associated modification code segments, the computer-executable instructions facilitating performing the steps of:
    receiving a set of original program segments referenced by the executable program, each of the set of original program segments comprising executable binary code;
    identifying a set of substitute program segments associated with ones of the original set of program segments;
    modifying executable binary code of the ones of the original set of program segments to include an exception inducing code, the exception inducing code comprising executable binary code; and
    creating an association between ones of the set of original program segments and ones of the set of substitute program segments, each association comprising a program matching criteria for determining whether to execute the substitute program segment depending on an identity of a calling module of the original program segment.

20. The computer-readable medium of claim 19 wherein the substitute program segments comprise functions.

21. The computer-readable medium of claim 20 wherein the functions comprise application program interfaces.

22. The computer-readable medium of claim 21 wherein the application program interfaces are part of an operating system.

23. The computer-readable medium of claim 19 wherein the creating an association step comprises building a table entry including a called original program segment reference and a substitute program segment reference.

24. The computer-readable medium of claim 23 wherein the called original program segment reference comprises an address.

25. The computer-readable medium of claim 23 further comprising computer-executable instructions facilitating:
    storing a portion of the original program segment replaced by the exception inducing code in table entry.

26. The method of claim 23 further comprising computer executable instructions facilitating:
    storing a condition description specifying a program execution state under which a substitute program segment will not be executed in place of an associated called original program segment.

27. The computer-readable medium of claim 19 wherein the identifying step comprises searching a program modification database including a set of identified programs and corresponding substitute program segments.

28. The computer-readable medium of claim 19 further comprising computer-executable instructions facilitating:
  loading an executable program into active process space;
  identifying an in-memory patch within the program modification database corresponding to the executable program; and
  inserting an in-memory patch within the executable program residing in the active process space.

29. A computer-readable medium having computer-executable instructions for facilitating implementing execution of substitute program segments associated with an active executable program, the computer-executable instructions facilitating performing the steps of:
  calling, from a calling module having an identity, an original program segment of the active executable program that has been modified to include a previously placed exception inducing code, the previously placed exception inducing code comprising executable binary code that induces an exception handled by an exception handling routine;
  detecting the previously placed exception inducing code;
  first determining a corresponding substitute program segment entry in a program segment substitution list;
  determining whether to execute a substitute program segment associated with the corresponding substitute program segment entry depending on the identity of the calling module; and
  if so determined, executing the substitute program segment in place of the original program segment.

30. The computer-readable medium of claim 29 wherein determining whether to execute a substitute program segment comprises determining, by reference to an exclusion/inclusion policy associated with the instance of the exception inducing code, whether to perform the substitute program segment in place of the original program segment, wherein the exclusion/inclusion policy identifies at least a condition depending on the identity of the calling module under which the corresponding substitute program segment will not be executed in place of an associated original program segment.

31. The computer readable storage medium of claim 30 wherein the corresponding substitute program segment entry includes a portion of the original program segment replaced by the exception inducing code, and further comprising computer-executable instructions facilitating:
  determining that the condition under which the corresponding substitute program segment will not be executed has been fulfilled, and in response restoring within a program code execution stream the portion of the original program segment replaced by the exception inducing code.

32. The computer-readable medium of claim 30 wherein the substitute program segments comprise functions.

33. The computer-readable medium of claim 32 wherein the functions comprise application program interfaces.

34. The computer-readable medium of claim 33 wherein the application program interfaces are part of an operating system.

35. The computer-readable medium of claim 29 wherein the corresponding substitute program segment entry includes a called original program segment reference and a substitute program segment reference.

36. A program execution system facilitating modifying an executable program, including a set of original program segments referenced by the executable program, each of the set of original program segments comprising executable binary code, the program execution system comprising:
  a program modification database for storing a set of substitute program segments associated with ones of the original set of program segments;
  a program loader for installing a copy of the executable program into an active process space;
  a program code modifier for altering, within the active process space, executable binary code of the ones of the original set of program segments to include an exception inducing code, the exception inducing code comprising executable binary code; and
  a substitution list including entries describing an association between ones of the set of original program segments and ones of the set of substitute program segments, each association comprising a program matching criteria for determining whether to execute the substitute program segment depending on an identity of a calling module of the original program segment.

37. The program execution system of claim 36 wherein the substitute program segments comprise functions.

38. The program execution system of claim 37 wherein the functions comprise application program interfaces.

39. The program execution system of claim 38 wherein the application program interfaces are part of an operating system.

40. The program execution system of claim 36 wherein individual entries within the substitution list included a called original program segment reference and a substitute program segment reference.

41. The program execution system of claim 40 wherein individual entries within the substitution list include a portion of the original program segment replaced by the exception inducing code.

42. The program execution system of claim 36 further comprising:
  an in-memory patch within the program modification database corresponding to the executable program; and
  an in-memory patching function for inserting the in-memory patch within the executable program residing in the active process space.

* * * * *